Figure 1:
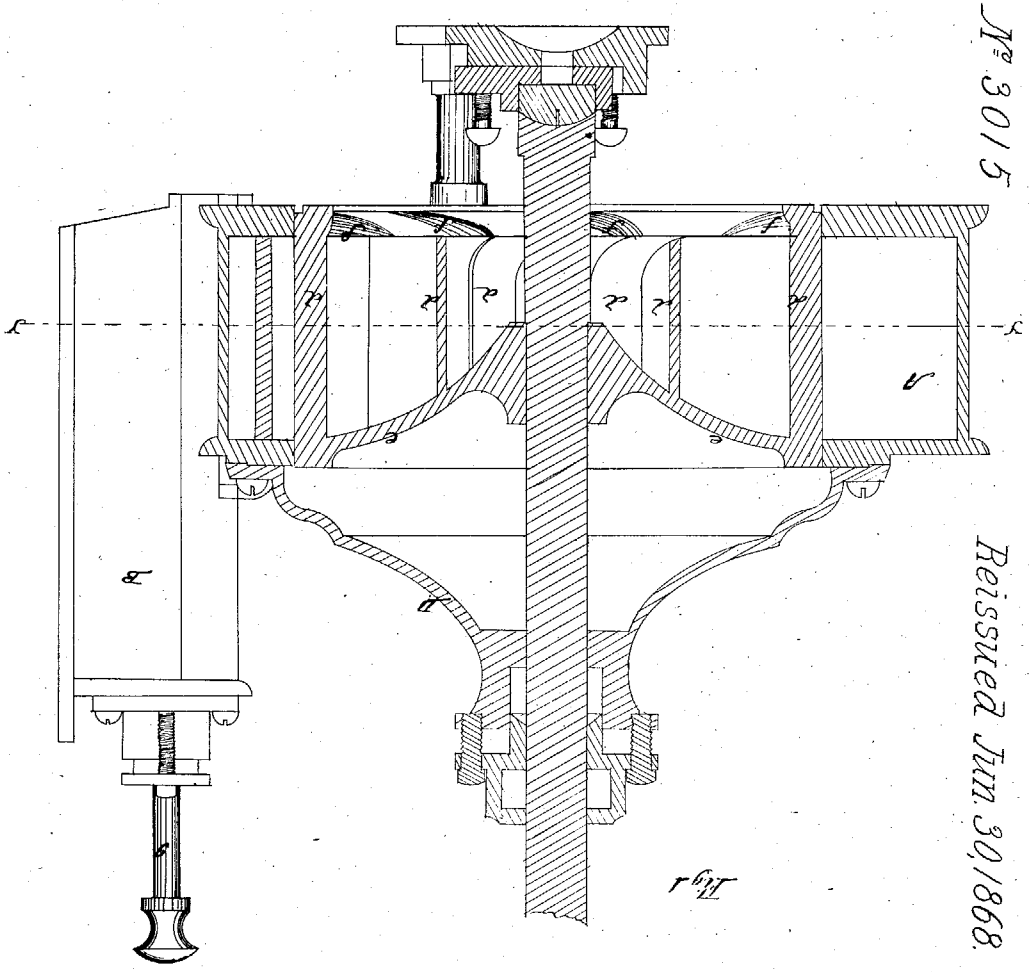

J. Tyler.

Sheet 1
1 Sheet.

Water-Wheel.

No. 3015

Reissued Jun. 30, 1868.

Sheet 2
2 Shts
J. Tyler.
Water-Wheel.
№ 3015 Reissued Jun. 30, 1868.
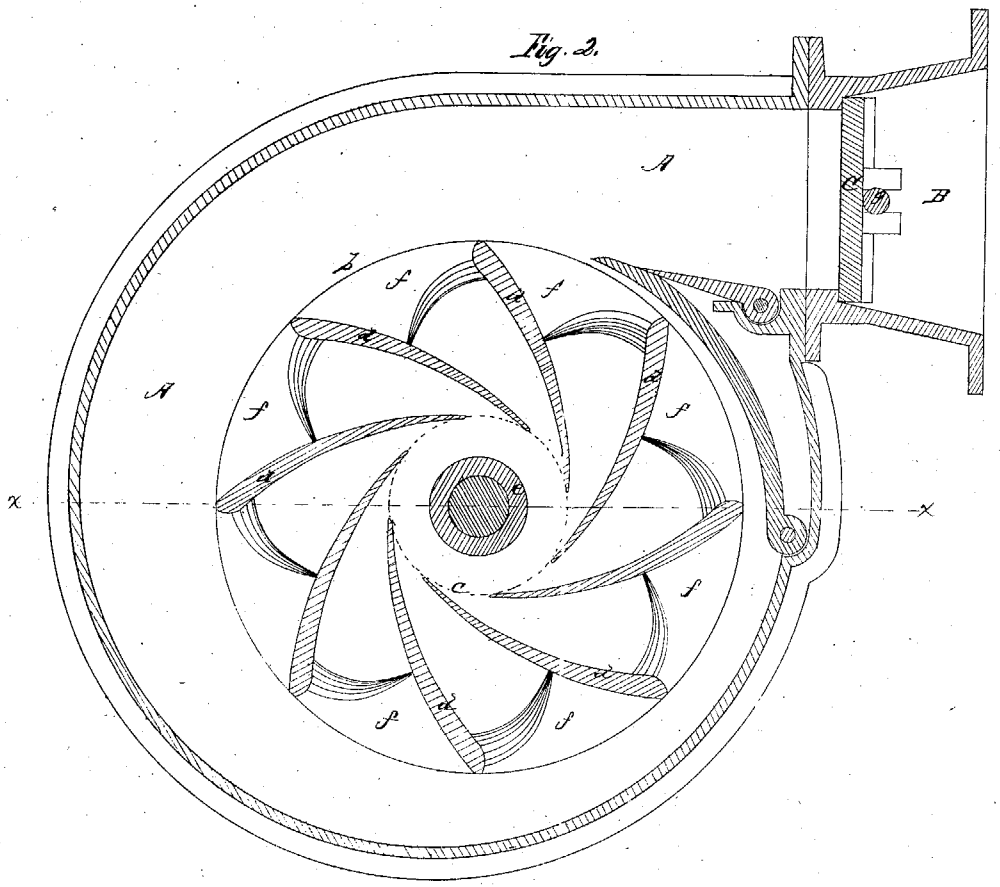

United States Patent Office.

JOHN TYLER, OF WEST LEBANON, NEW HAMPSHIRE.

*Letters Patent No.* 15,309, *dated July* 8, 1856; *reissue No.* 3,015, *dated June* 30, 1868.

IMPROVED WATER-WHEEL.

The Schedule referred to in these Letters Patent and making part of the same.

TO ALL WHOM IT MAY CONCERN:

Be it known that I, JOHN TYLER, of West Lebanon, in the county of Grafton, and State of New Hampshire, have invented sundry new and useful Improvements in Water-Wheels; and I do hereby declare that the following is a full and exact description thereof, reference being had to the accompanying drawings, which form a part of this specification—

Figure 1 being a vertical section of my improved water-wheel in the line *x x* of fig. 2, and Figure 2 is a horizontal section in the line *y y* of fig. 1.

Similar letters indicate like parts in each figure of said drawings.

The bucket-head, *e*, of my improved water-wheel, and the buckets, *d d*, descending from said head, are enclosed by a scroll-shaped water-way, A, as shown in the accompanying drawings. The proper shape and position are given to the said buckets *d d* by the following method, to wit:

Draw a circle, *b*, of a diameter corresponding with that of the bucket-head of the water-wheel to be constructed; then, from the same initial point, draw an inner concentric circle, *c*; then place the pivot-leg of the compasses upon the said outer circle *b*, and so adjust the marking-leg of the instrument that it will form a curve tangential to the said inner circle *c*, which curve, when extended from the inner circle *c* to the outer circle *b*, will give the desired and the best possible shape for the convex surface of the respective buckets *d d*, and also the best position that the said convex surface of each bucket can occupy beneath the bucket-head *e*.

In practice, I have ascertained that the best water-wheel is produced when the diameter of the inner guiding circle *c* is from one-third to one-half that of the outer guiding circle *b*.

The buckets *d d* are cast in one piece with the bucket-head *e*. The under surface of the bucket-head, or that portion thereof from which the buckets descend, curves upwards and outwards from the central aperture therein, and to such a degree as to cause the water to act in a condensed and continuous body upon the convex surface of the respective buckets, and to pass so rapidly through the wheel as to leave the same the instant that its propelling force ceases to act upon the said series of buckets. The said curvature of the bucket-head *e* also causes the passage of the water through the water-wheel to exert a lifting action thereupon, which causes a considerable diminution of the friction upon the lower bearing of the wheel, and a corresponding addition to the power of the wheel.

The lower edges of the series of buckets *d d* are connected with each other by a rim, *f*, whose inner edge is of the bevelled and scallop-shape represented in the accompanying drawings. The said rim *f* extends inwards, in close contact with the convex surface of each bucket, a distance equal to about three-sevenths of the length of said surface, and from that point it curves outwards and downwards, to a narrow connection between the said rim and the outer extremity of the concave surface of the next bucket in succession, and so onwards around the wheel.

The object of giving the aforesaid shape to the rim *f*, is to enable it to conduct the water from the water-way A against the central portion of the convex surface of each one of the buckets, before it commences its downward descent and exit from the wheel.

An air-tight and centrally-elevated cover, D, is combined with the upper edge of curb of my improved water-wheel, in such a manner as to form an air-tight joint between the two. An air-tight packing-box, E, which is combined with the aperture in the apex of the curb-cover D, forms the upper bearing of the water-wheel shaft. The air-tight chamber within the curb, and the curb-cover of my improved water-wheel, prevent the rising of any water from below into the same, and consequently the said water-wheel can be operated, without any material loss of power, when immersed in back-water. When used in cold climates, my improved water-wheel can be protected from the injurious effects of the frost by immersing it in standing water.

The curb-cover D is sufficiently elevated to form a firm and reliable upper bearing to the water-wheel shaft, and consequently the said shaft can be connected directly to the machinery that is to be operated thereby, without the aid of auxiliary shafting.

The gate-box B, which is combined with the mouth of the water-way A by means of screw-bolts or other suitable devices, is of sufficient height to enable the gate C to be operated within said box. The said gate may be operated by means of the shank *g* which rises therefrom, and passes through a packed aperture in the top of the gate-box, substantially as shown in the accompanying drawings.

Suitable flanges, lugs, or ears should be cast or formed on the outer edges of the gate-box B, to enable the same to be directly connected with any water-supplying flume, tube, or trunk.

It will therefore be perceived that my improved water-wheel can be directly connected with any water-supplying flume, tube, or trunk, and, after being so connected, power can be communicated from the shaft of said wheel to any machinery that is to be propelled thereby.

Having thus fully described my new and improved water-wheel, what I claim therein as my invention, and desire to secure by Letters Patent, is—

The curved bucket-head *e*, when the said head is combined with the series of segment-shaped buckets *d d*, substantially in the manner herein set forth.

I also claim the segment-shaped buckets *d d*, when the said buckets are formed with and project from the concave surface of the curved bucket-head *e*, substantially as herein set forth.

I also claim the combination of the buckets *d d* with the bucket-head *e*, when the said buckets are located in positions tangential to the inner guiding circle *c*, substantially as herein set forth.

I also claim the combination of the scallop-edged rim *f* with the lower edges of the series of buckets *d d*, substantially as and for the purpose herein set forth.

I also claim the combination of the elevated cover D with the curb of my improved water-wheel, when the said cover is so proportioned as to receive and sustain the upper bearing-box of the shaft of the wheel, substantially as herein set forth.

I also claim the combination of the detachable gate-box B with the mouth of the water-way of the water-wheel, all substantially in the manner and for the purpose herein set forth.

JOHN TYLER.

Witnesses:

J. D. Horley,

M. J. Burton.